Aug. 4, 1953 — E. B. TOPMILLER — 2,647,510
COMPOSITION TENDON SUPPORT
Filed Dec. 13, 1948
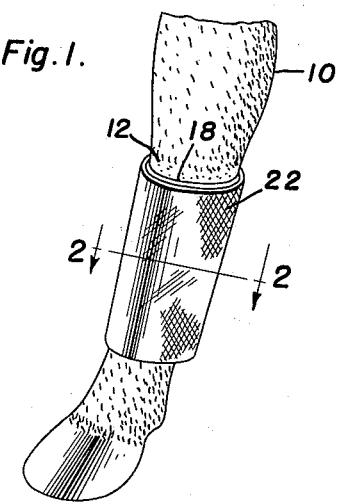
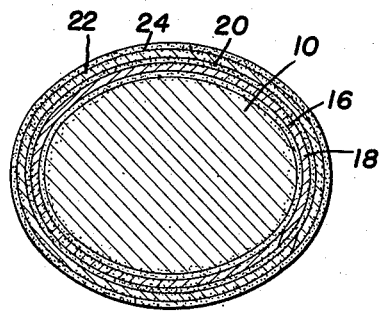
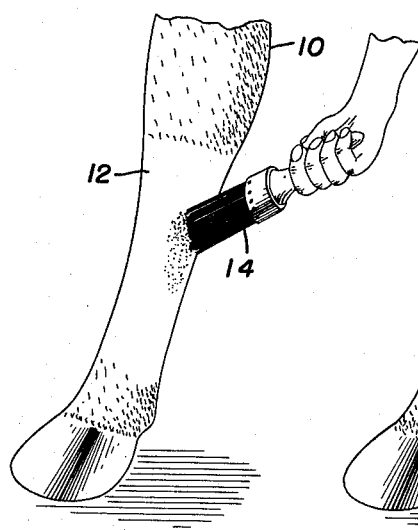
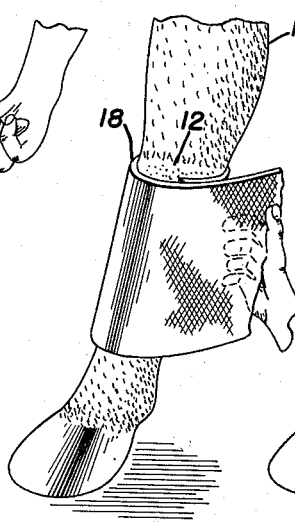
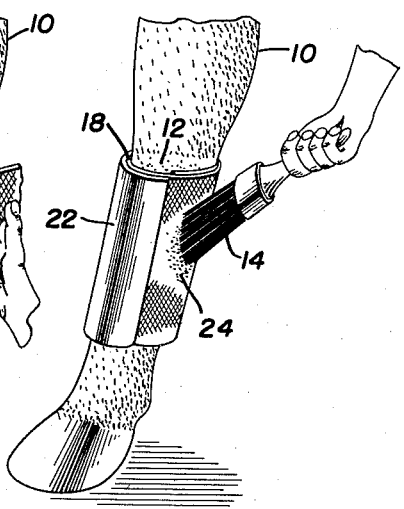
Edwin B. Topmiller
INVENTOR.

Patented Aug. 4, 1953

2,647,510

UNITED STATES PATENT OFFICE 2,647,510

COMPOSITION TENDON SUPPORT

Edwin B. Topmiller, Nashville, Tenn., assignor of nine per cent to Alma K. Topmiller, ten per cent to Edwin B. Topmiller, Jr., ten per cent to Dorothy Topmiller, ten per cent to Kathryn Garrison, and ten per cent to Anna C. Topmiller Application December 13, 1948, Serial No. 65,006

3 Claims. (Cl. 128—156)

1

This invention relates to a novel support and a method of applying the support to the limb of an animal and has for its primary purpose the rehabilitation of the animal incapacitated because of the pain of ruptured or strained tendons or ligaments and at the same time allowing the free play of the tendons and muscles in the damaged limb when the animal is at work or running without interference to the circulation in the limb.

A further object of this invention is to provide a novel support and a method of applying the support to the damaged limb of an animal which will relieve the pain and tension upon the damaged limb to the extent of allowing the animal to use the limb as freely and as naturally as if it were a sound structure, thereby making the animal useful throughout the period of repair.

A further object of this invention is to provide a novel support for impaired tendons and ligaments which, by virtue of its composition, will set to the consistency of rubber forming a lasting support for the damaged limb and producing enough resiliency to allow the more or less normal use of the tendons and ligaments while the animal is at work.

A still further object of this invention is to provide a novel composition tendon support which will permit a racing animal to function despite the impairment of tendons and ligaments in any limb of the animal. The nature of the support is such that when the animal warms up preparatory to racing, the bandage has the facility of expanding, and after racing and cooling off, the bandage has the facility of contracting and contacting the impaired parts of the limb to relieve the pain thereof.

The inventor is aware of art teaching the provision of plaster of Paris bandages to which have been added adhesive materials.

The prior art, however, fails to disclose the inventor's concept of using a tendon support of such composition that the animal can continue to work with the support on the impaired limb without any possible injury to the limb or to the circulation in the limb. And, as will become evident hereinafter, the inventor is not aware of any art which teaches the exact tendon support composition and the exact method of applying the tendon support to the impaired limb.

The tendon support composition and method of the instant invention will be fully described in connection with the accompanying drawings showing a preferred method of applying the tendon support to an impaired limb of an animal, in which:

2

Figure 1 is a perspective view of the tendon support as applied to the limb of an animal;

Figure 2 is a transverse sectional view taken substantially on the plane of section line 2—2 of Figure 1; and Figures 3 to 5 are perspective views illustrating the sequential steps in applying the support to the impaired limb.

In the several views in the accompanying drawings and in the following specification reference characters indicate corresponding elements throughout.

Indicated generally at 10 is the impaired limb of any animal, it being understood that this limb has a strained or ruptured tendon or ligament. The hair in the impaired area is first shaven as indicated at 12 and to this shaven area is applied an aqueous viscous solution which will be described immediately hereinafter. The solution may be applied by means of a brush 14, may be sprayed on the shaven area, or may be coated on the area in any suitable manner as will be obvious to those skilled in the art.

The aqueous viscous solution comprises gelatine, glycerine and water. The aqueous solution consists preferably of one pound of gelatine and four ounces of glycerine dissolved in one quart of water. The method of combining these three ingredients consists essentially of triturating the gelatine and placing it in the upper portion of a double boiler. Thereafter the glycerine and water are added to the gelatine, the bottom half of the double boiler is filled with water, and the boiler then is placed on a flame. After the water in the bottom half of the boiler has come to the boiling point, it is maintained at this temperature for approximately one hour or until the contents of the upper portion of the double boiler reach a state of liquefication. This aqueous solution is applied to the shaven area 12 in its heated condition.

After the shaven area has been coated with this aqueous viscous solution, indicated generally at 16, a textile webbing 18 is wrapped around the coated area. The textile webbing may be cotton gauze or any other suitable webbing which has been previously dusted with plaster of Paris.

Thereafter, by means of spraying or brushing as shown clearly in Figure 5, another layer of the aqueous viscous solution is applied to the outer surface of the webbing as indicated at 20. As will be understood at this point, the aqueous viscous solution not only impregnates the webbing but also forms a coating on the outer surface of the webbing since the solution is applied in a heated condition.

If desired, successive layers 22 may be wrapped about the first coated webbing and treated in the same manner as described hereinabove. In this manner, a support of desired thickness can be applied to the impaired limb which will function as a support and at the same time will be resilient enough to permit the full use of the limb with the support thereon. As mentioned previously, the support will set to the consistency of rubber and will permit expansion when the limb warms up and contraction when the limb cools down.

A final layer of the aqueous solution 24 is sprayed, brushed or coated on the outermost layer of gauze or webbing 22.

Thus it will be seen that a novel tendon support and method of applying the support to an impaired limb are provided. The support functions extremely efficiently for its intended purpose of relieving the pain of the imparied tendons and ligaments and at the same time allowing full use of the limb in a normal manner. It should be understood, at this point, that minor variations in the aqueous composition and tendon support and the method of applying the tendon support to the impaired limb may be made by those skilled in the art without departing from the spirit of the invention and the scope of the appended claims.

Having described the invention, what is claimed as new is:

1. In a tendon support an inner layer of a composition comprising glycerine, gelatine and water, a textile layer consisting of a webbing dusted with plaster of Paris, an outer layer of the above named composition, the said composition also impregnating the textile webbing, the proportions of glycerine, gelatine and water in the above named composition being so selected that it sets to a consistency similar to that of rubber and that the support is capable of expanding and contracting with the limb while supporting the limb so as to relieve pain.

2. A tendon support as claimed in claim 1 in which the composition impregnating the textile webbing comprises for every quart of water 4 oz. of glycerine and 1 lb. of gelatine.

3. A tendon support as claimed in claim 1 comprising a plurality of superimposed layers of textile webbing separated by layers of said composition consisting of glycerine, gelatine and water, with each of the superimposed layers of textile webbing being dusted with plaster of Paris and impregnated with the above named composition.

EDWIN B. TOPMILLER.

References Cited in the file of this patent

UNITED STATES PATENTS

| Number | Name | Date |
|---|---|---|
| 126,851 | Taylor | May 14, 1872 |
| 758,243 | Goldman | Apr. 26, 1904 |
| 937,478 | Sims | Oct. 19, 1909 |
| 1,131,295 | Touart | Mar. 9, 1915 |
| 1,383,068 | Bosshard | June 28, 1921 |
| 1,755,744 | Munktell | Apr. 22, 1930 |
| 1,953,898 | Reed | Apr. 3, 1934 |
| 2,053,728 | Mienes | Sept. 8, 1936 |

FOREIGN PATENTS

| Number | Country | Date |
|---|---|---|
| 360,386 | Great Britain | Apr. 29, 1930 |